United States Patent [19]

Yamamoto et al.

[11] Patent Number: 5,020,001
[45] Date of Patent: May 28, 1991

[54] ROBOT CONTROLLER

[75] Inventors: Katsumi Yamamoto, Takahama; Tadashi Koyama, Okazaki; Toshio Aono, Kariya; Toshiro Itaya, Aichi, all of Japan

[73] Assignee: Toyoda Koki Kabushiki Kaisha, Kariya, Japan

[21] Appl. No.: 407,585

[22] Filed: Sep. 15, 1989

[30] Foreign Application Priority Data

Sep. 19, 1988 [JP] Japan ................... 63-235738

[51] Int. Cl.$^5$ ............................................ G05B 19/42
[52] U.S. Cl. .................. 364/513; 364/474.13; 901/2
[58] Field of Search ............. 901/2, 3, 5, 6, 8, 19, 901/20, 23, 41; 364/132, 513, 577, 458, 571.02, 571.04, 474.1, 474.2, 474.3, 474.17, 474.26, 474.13, 474.34, 474.36

[56] References Cited

U.S. PATENT DOCUMENTS

| | | | |
|---|---|---|---|
| 4,348,623 | 9/1982 | Kobayashi | 901/6 |
| 4,495,588 | 1/1985 | Nio et al. | 901/3 |
| 4,528,632 | 7/1985 | Nio et al. | 364/474.31 |
| 4,665,493 | 5/1987 | Hattori | 364/474.31 |
| 4,698,777 | 10/1987 | Toyoda et al. | 901/3 |
| 4,706,204 | 11/1987 | Hattori | 364/474.31 |
| 4,823,279 | 4/1989 | Perzley et al. | 364/513 |
| 4,831,547 | 5/1989 | Ishiguro et al. | 364/513 |
| 4,853,603 | 8/1989 | Onoue et al. | 901/40 |
| 4,920,500 | 4/1990 | Hetland et al. | 901/3 |

Primary Examiner—Allen R. MacDonald
Assistant Examiner—George Davis
Attorney, Agent, or Firm—Oblon, Spivak, McClelland, Maier & Neustadt, P.C.

[57] ABSTRACT

A robot controller for having a workpiece held by a robot and having the workpiece machined by moving it relative to a stationary tool. The robot controller can control the velocity of relative motion, against the tool, of a machining point on the workpiece. At each teaching point, a transformation matrix is calculated to convert a position matrix of the flange center as teaching data (i.e., 4×4 matrix giving position and attitude in homogeneous coordinates) into a position matrix of the tool tip. Between two adjacent teaching points, interpolation points are set according to a specified velocity. Transformation matrices applicable to the two teaching points are put to interpolation calculations to provide a transformation matrix at each interpolation point. An inverse matrix of the transformation matrix at each interpolation point is applied to the position matrix for the tool tip. This allows the position matrix for the flange center keyed to each interpolation point to be calculated. Using the position matrix for the flange center, rotation angles on the controllable axes of the robot are calculated. With the distance between interpolation points set based on a given velocity, the machining velocity at any machining point may be controlled.

4 Claims, 7 Drawing Sheets

ROBOT CONTROLLER

BACKGROUND OF THE INVENTION

The present invention relates to a robot controller for controlling the position and attitude of the hand of a robot holding a workpiece and, more particularly, to a robot controller adapted to have the workpiece machined by suitably moving it relative to a tool fixedly mounted on a tool bed.

FIG. 8 shows a conventional laser machining system that uses an articulated six-axis robot 30 (hereinafter called the robot). In the machining system, a workpiece W is fixedly mounted on a work bed 32 that remains stationary, with a tool T gripped by the hand of the robot 30. As the rotational amount of each controllable axes of the robot 30 changes under control, the position and attitude of the tool T are varied relative to the workpiece W. As a result, the workpiece W is cut along the path that was taught beforehand.

Under robot control, the position of the tool T is represented by a tool tip position vector whose components are indicated by a stationary coordinate system fixed to the shop floor. The attitude of the tool T is represented by a matrix of 3 rows and 3 columns (hereinafter called the attitude matrix). The attitude matrix is a representation of three mutually perpendicular unit vectors whose components are indicated by the stationary coordinate system fixed to the shop floor. The three unit vectors are provided in a rectangular coordinate system whose origin is fixed to the tip of the tool T. The position and attitude of the tool tip are represented together by a matrix of 4 rows and 4 columns using the above-described position vector and attitude matrix in homogeneous coordinates. (This 4-row, 4-column matrix representing the position and attitude of the tool tip in homogeneous coordinates is hereinafter called the position matrix.) The position matrix of the tool tip is expressed by a function that regards as a variable the rotation angle on each of the controllable axes of the robot. At a given point in time, the position matrix of the tool tip is obtained using the rotation angles on the controllable axes of the robot as it takes a particular position and attitude. Conversely, where the position matrix of the tool tip is known, the rotation angle on each of the controllable axes of the robot is determined as corresponding to that matrix.

The position and attitude of the tool T at any point on a machining path are taught beforehand using the position matrix of the tool tip described above. Between teaching points, interpolation calculations are made on the position and attitude of the tool tip so that the tool T moves along the path smoothly in terms of its position and attitude. The position matrix of the tool tip obtained from the interpolation is then subjected to inverse transformation. This yields a rotation angle on each of the controllable axes of the robot. With its axes controlled to attain the respective rotation angles, the robot follows the interpolated positions and attitudes as it moves on.

There is the so-called rotational axis method for making the interpolation calculations mentioned above. According to this method, changes in the attitude of the tool T between two given teaching points are represented by a rotating motion around a predetermined axis. That rotation angle around the axis which corresponds to the tool movement between the two points is split into as many divisions as the number of interpolation points. Each division is a unit rotation angle. The attitude of the tool at each interpolation point is obtained by rotating the tool from its first teaching point by a multiple of the unit rotation angle. The tool position is interpolated as follows. First, a displacement vector between teaching points is split into as many divisions as the number of interpolation points. Each division is the unit vector. A multiple of the unit vector is added to the position vector of the tool tip in effect at the first teaching point. This provides the position vector of the tool tip at each interpolation point.

There is then provided an operator by which to perform interpolation calculations on the position and attitude of the tool tip at the same time. The operator is an attitude transformation matrix of 4 rows and 4 columns, represented by homogeneous coordinates. Using the operator, the tool is rotated by a multiple of the unit rotation and is moved by a multiple of the unit vector. Namely, the attitude transformation matrix is applied to the position matrix of the teaching point which becomes a starting point between the two adjacent teaching points. This makes it possible to find the position matrix of the tool tip at each interpolation point.

Now, there may be cases where it is preferable to machine the workpiece by suitably moving it relative to the tool fixed on the tool bed, instead of the tool being moved onto the workpiece for machining. For example, the robot may grip the workpiece at a predetermined position, allow the workpiece to gain access to the tool, and machine the workpiece by moving it along a predetermined path relative to the tool. After machining, the robot may carry the workpiece to another predetermined position. According to this machining method, a single robot can take care of the entire series of workpiece-related actions, from loading to machining to unloading. An advantage of this method is a reduced machining time.

However, there are constraints on the above-described method. As shown in FIG. 9, where the workpiece is moved by the robot, lengths $l_1$ and $l_2$ between machining locations $L_1$ and $L_2$ on the one hand, and flange center 11 of the hand 40 of the robot 40 on the other, vary with changing machining locations. This means that the position matrix of a machining point on the workpiece W cannot be determined using rotation angles on the controllable axes of the robot. Where the workpiece W is gripped by the robot for machining, there is thus only one way to teach path point data: by use of the position matrix keyed to the flange center of the robot hand. The trouble is this: when the position and attitude of the flange center are changed at a constant velocity by making interpolation calculations under the rotational axis method on the position matrix of the flange center, the velocity at which the machining point moves relative to the tool T does not remain constant. In FIG. 9, for example, the machining velocity V at location $L_1$ is higher than the machining velocity V' at location $L_2$ when the workpiece is rotated around the flange center.

As describe above, in conventional setups where the workpiece W is held by the robot for machining, it is impossible to control the velocity of movement at the point of machining according to varying command values.

Therefore, in applications where sufficiently high levels of machining precision are obtained only if the machining velocity is made constant or is set to follow command values as they change, such as laser cutting, ark welding and deburring, it is necessary to program a large number of velocity change commands between movement commands so as to move the tool tip at a constant velocity relative to the workpiece. The problem with such arrangements is twofold: that the program to be entered by the worker becomes increasingly complicated, and that it is difficult to control the machining velocity with precision. For all the trouble taken, the accuracy of machining tends to deteriorate.

SUMMARY OF THE INVENTION

It is therefore an object of the present invention to provide a controller which, with a workpiece gripped by a robot in its hand, controls the robot to machine accurately the workpiece by moving it relative to a fixedly mounted tool in accordance with a machining velocity taught in command values.

It is another object of the present invention to provide higher levels of machining precision through accurate control of the machining velocity according to the command values.

It is a further object of the present invention to provide means for keeping the machining velocity constant throughout the entire machining path so as to make the finishing precision of the workpiece uniform.

It is yet another object of the present invention to provide a setup that has the robot keep the workpiece gripped throughout the machining process so as to reduce the overall machining time.

A robot controller according to the present invention is a system that has a robot grip a workpiece and controls the robot to machine the workpiece through movement relative to a fixed tool. The robot controller is capable of control over the velocity at which the point of machining on the workpiece moves relative to the tool.

According to one aspect of the present invention, there is provided a teaching process in which a position matrix representing the position and posture of the tip of the tool fixed on the tool bed is stored in memory as a tool matrix. Also in the teaching process, the workpiece is specified in terms of movement relative to the stationary tool. At each of the teaching points along a machining path on the workpiece, there is calculated a position matrix representing the origin of a coordinate system for the robot hand and the attitude of that hand through the use of rotation angles on the controllable axes of the robot. The position matrix is stored in memory as a teaching matrix at each teaching point. Then in the machining process, there is calculated, at each teaching point, a transformation matrix for turning the tool matrix into the teaching matrix and vice versa. This is a tool transformation matrix. According to the machining velocity taught, there are specified interpolation points between any two adjacent teaching points along the machining path. Using the tool transformation matrices for the two adjacent teaching points, the tool transformation matrix at each interpolation point is calculated as an interpolation tool transformation matrix. Based on this interpolation tool transformation matrix and the tool matrix for each interpolation point, there is calculated a position matrix representing the origin of the coordinate system for the robot hand and the attitude of that hand. This is an interpolation teaching matrix. Finally, the interpolation teaching matrix for each interpolation point is used to calculate the rotation angle on each of the controllable axes of the robot. The axes are controlled according to the rotation angles thus obtained to control both the origin of the robot hand and the attitude of that hand.

The present invention is characterized in particular by its provision for controlling the velocity of movement of the workpiece relative to the tool tip through interpolation of tool transformation matrices.

DETAILED DESCRIPTION OF THE PREFERRED EMBODIMENT

What follows is a detailed description of the preferred embodiment according to the present invention.

Figure 2:
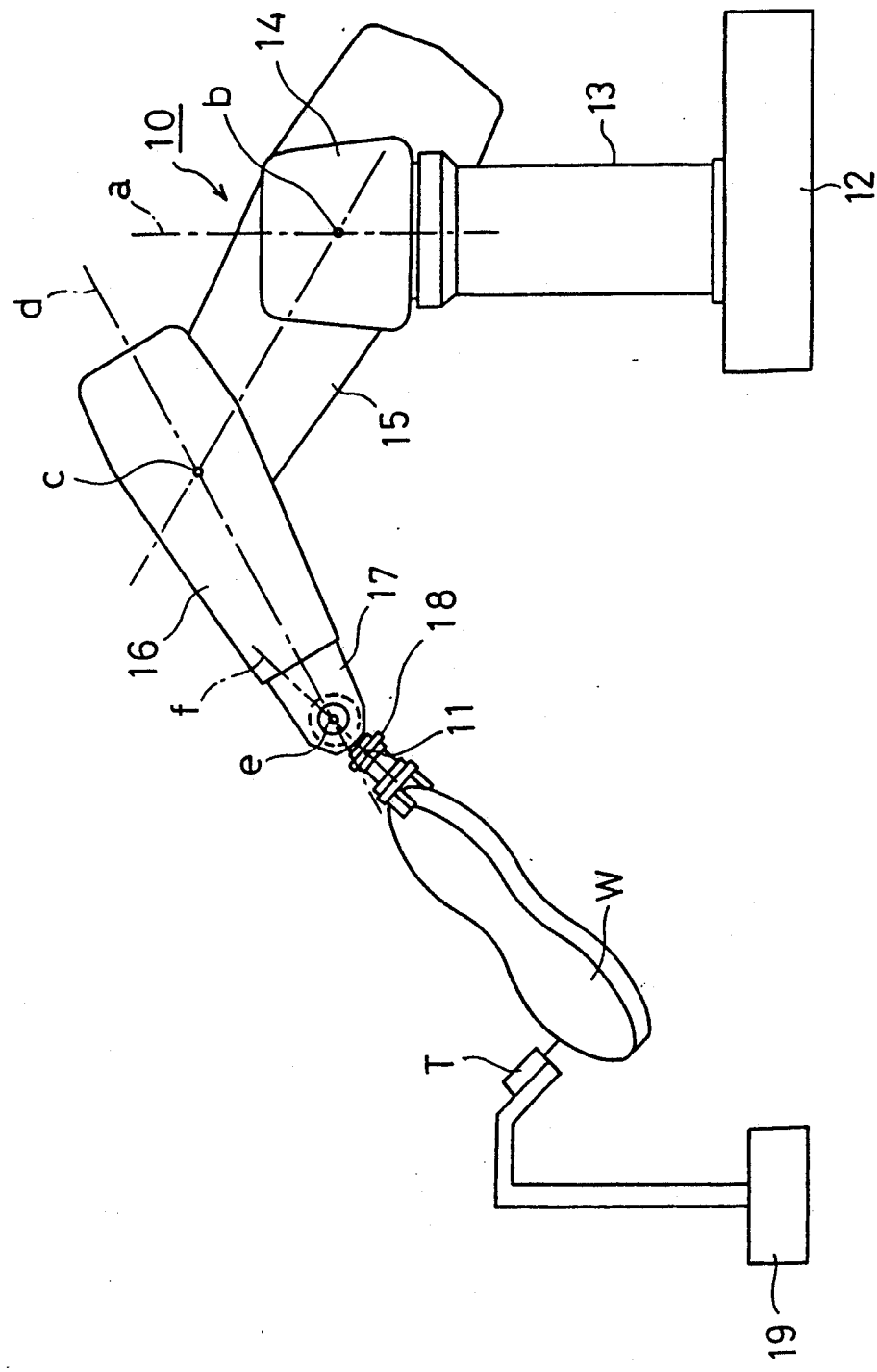
FIG. 2 is a view depicting a robot, its mechanisms to be controlled by a robot controller embodied according to the present invention, a workpiece, and a tool, all components schematically related to one another.

In FIG. 2, numeral 10 is a robot. On the shop floor, a base 12 is provided to secure the robot 10. A column 13 is fixedly mounted on the base 12. The column 13 rotatably accommodates a body 14. The body 14 rotatably supports an upper arm 15 which in turn rotatably supports a forearm 16. The body 14, upper arm 15 and forearm 16 are rotated around controllable axes a, b and c, respectively, by servo motors M1, M2 and M3 (shown in FIG. 3). Rotation angles on the controllable axes a, b and c are detected by encoders E1, E2 and E3, respectively. The tip of the forearm 16 rotatably supports a wrist 17 around an axis d. The wrist 17 in turn rotatably supports a hand 18 around an axis e. The hand 18 also rotates around an axis f, equipped with a flange center 11 that serves as the origin of a coordinate system fixed to the hand 18. The hand 18 grips a workpiece W. The axes d, e and f are driven by servo motors M4, M5 and M6, respectively. A tool bed 19 fixedly holds a tool T for machining the workpiece.

Figure 3:
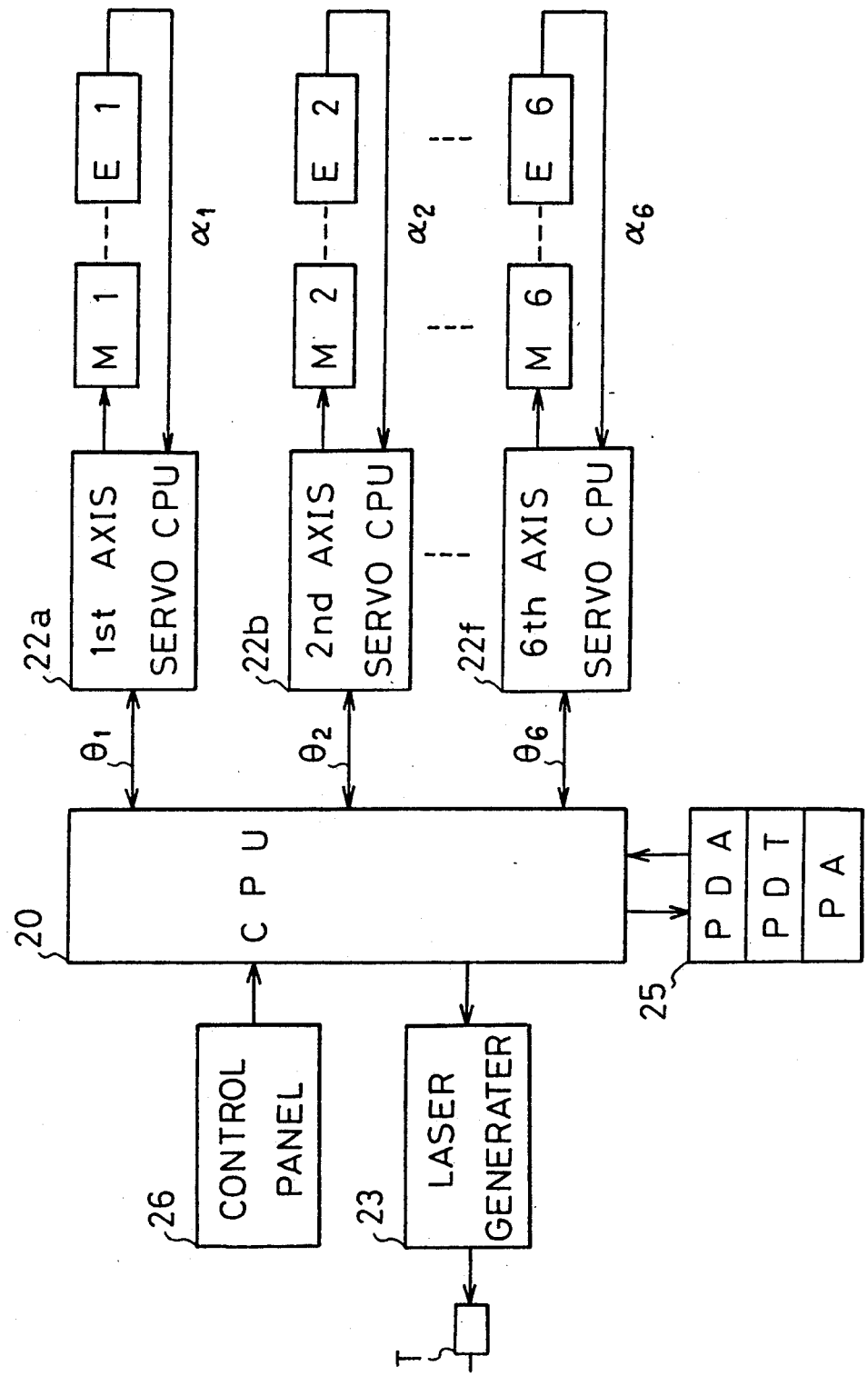
FIG. 3 is a block diagram showing electrical arrangements of the robot controller embodied according to the present invention.

In FIG. 3, numeral 20 is a central processing unit (hereinafter called the CPU) comprising a microcomputer and other components. The CPU 20 is connected with: a memory (RAM) 25; servo CPU's 22a through 22f; a control panel 26 used to give commands for jog operation and instructions for specifying points of a machining path; and a laser generator 23. The laser generator 23 is connected to a tool T. The servo motors M1 through M6 for driving the controllable axes a through f on the robot body 10 are driven by the servo CPU's 22a through 22f, respectively.

The servo CPU's 22a through 22f calculate the deviation between output angle data $\theta_1$ through $\theta_6$ from the CPU 20 on the one hand, and outputs $\alpha_1$ through $\alpha_6$ from the encoders E1 through E6 coupled with the servo motors M1 through M6 on the other. The servo motors M1 through M6 are run at speeds corresponding to the magnitude of the deviation thus obtained.

The memory 25 has a PA area, a PDA area and a POT area. The PA area contains a program that causes the robot 10 to operate according to taught data. The PDA area stores a teaching matrix representing the positions and attitudes of the hand 18 of the robot 10 at the flange center 11. The POT area contains a tool matrix representing the position and attitude of the tip of the tool T.

Figure 1:
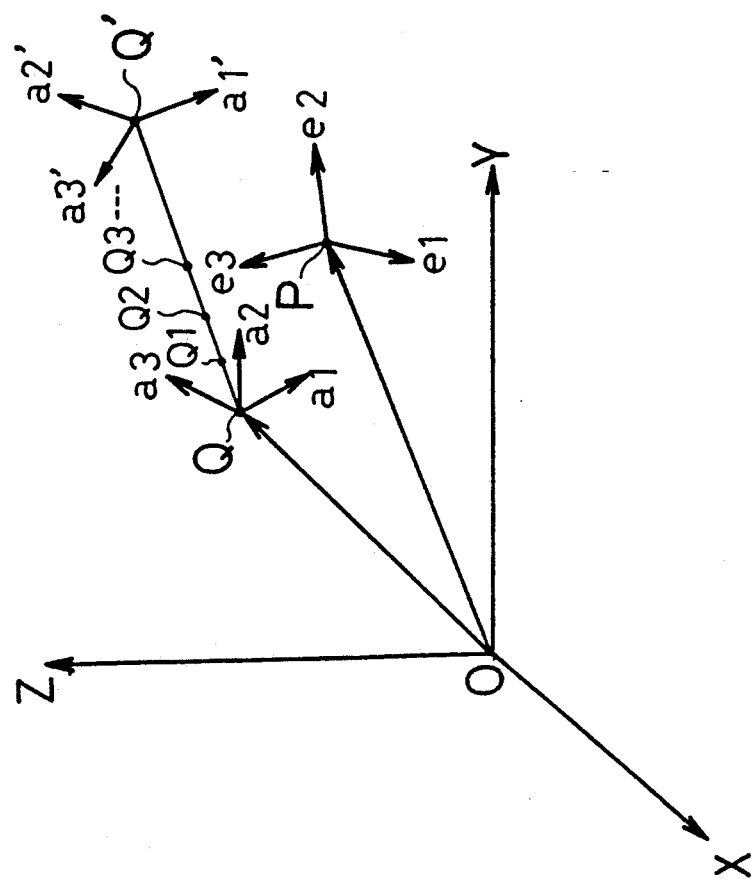
FIG. 1 is a view showing how a coordinate system of a tool tip is related to another coordinate system keyed to the flange center of a robot hand.

Now the operation of the CPU 20 is explained. In FIG. 1, an O-XYZ coordinate system is a rectangular coordinate system (hereinafter called the stationary coordinate system) that is fixed to the shop floor in space. A point P represents the tip of the tool T that is fixedly mounted on the tool bed 19. A point Q represents the flange center 11 of the hand 18 for the robot 10 that holds the workpiece W. (The flange center in this positional relation is hereinafter called, without qualifications, the flange center.) Unit vectors $\vec{e1}$, $\vec{e2}$ and $\vec{e3}$ are fixed to the tip P of the tool T, as shown. In order to represent the attitude at the flange center Q, unit vectors $\vec{a1}$, $\vec{a2}$ and $\vec{a3}$ are fixed to the flange center as illustrated. The components of these unit vectors are defined by the following expressions in the stationary cordinate system fixed to the shop floor:

$$\vec{e1} = (T_{11}, T_{12}, T_{13}) \quad (1)$$

$$\vec{e2} = (T_{21}, T_{22}, T_{23}) \quad (2)$$

$$\vec{e3} = (T_{31}, T_{32}, T_{33}) \quad (3)$$

$$\vec{a1} = (F_{11}, F_{12}, F_{13}) \quad (4)$$

$$\vec{a2} = (F_{21}, F_{22}, F_{23}) \quad (5)$$

$$\vec{a3} = (F_{31}, F_{32}, F_{33}) \quad (6)$$

The position vector components for the points P and Q in the stationary coordinate system are defined by the following expressions:

$$\vec{OP} = (P_x, P_y, P_z) \quad (7)$$

$$\vec{OQ} = (Q_x, Q_y, Q_z) \quad (8)$$

Therefore, the position matrix T for the tip of the tool T and the position matrix F for the flange center Q are defined as follows.

$$T = \begin{bmatrix} T_{11} & T_{12} & T_{13} & P_x \\ T_{12} & T_{22} & T_{32} & P_y \\ T_{13} & T_{23} & T_{33} & P_z \\ 0 & 0 & 0 & 1 \end{bmatrix} \quad (9)$$

$$F = \begin{bmatrix} F_{11} & F_{12} & F_{13} & Q_x \\ F_{12} & F_{22} & F_{32} & Q_y \\ F_{13} & F_{23} & F_{33} & Q_z \\ 0 & 0 & 0 & 1 \end{bmatrix} \quad (10)$$

In the foregoing description, the matrix of 3 rows and 3 columns at top left is an attitude matrix.

A transformation matrix M is defined as follows.

$$M = \begin{bmatrix} M_{11} & M_{12} & M_{13} & R_x \\ M_{12} & M_{22} & M_{32} & R_y \\ M_{13} & M_{23} & M_{33} & R_z \\ 0 & 0 & 0 & 1 \end{bmatrix} \quad (11)$$

The transformation matrix M is a matrix that converts the position matrix F for the flange center into the position matrix T for the tool tip. That is, the matrix M represents the position and attitude of the tip of the tool T in a Q-a1a2a3 coordinate system fixed to the flange center.

The direction cosines of the vector $\vec{e1}$ with respect to the $\vec{a1}$, $\vec{a2}$ and $\vec{a3}$ are ($M_{11}$, $M_{12}$, $M_{13}$); those of the vector $\vec{e2}$ are ($M_{21}$, $M_{22}$, $M_{23}$); and those of the vector $\vec{e3}$ are ($M_{31}$, $M_{32}$, $M_{33}$). The components of a vector $\vec{QP}$ in the Q-a1a2a3 coordinate system are ($R_1$, $R_2$, $R_3$). Thus there exists the following relationship among the matrices T, F and M:

$$T = F \cdot M \quad (12)$$

Now, it is assumed that the rotation angles on the controllable axes of the robot (a six-axis type) are:

$$(\theta_1, \theta_2, \theta_3, \theta_4, \theta_5, \theta_6) \quad (13)$$

Between the rotation angles (13) and the position matrix F for the flange center exist constant relations specific to the robot. The angles may be turned into matrices and vice versa. Since there exists the relationship given by the expression (12) between the position matrix T for the tool tip and the position matrix F for the flange center, the rotation angles (13) for the controllable axes are related to the matrices M and F. Thus it is possible to convert one matrix into another and angles into a matrix or vice versa.

Figure 4:
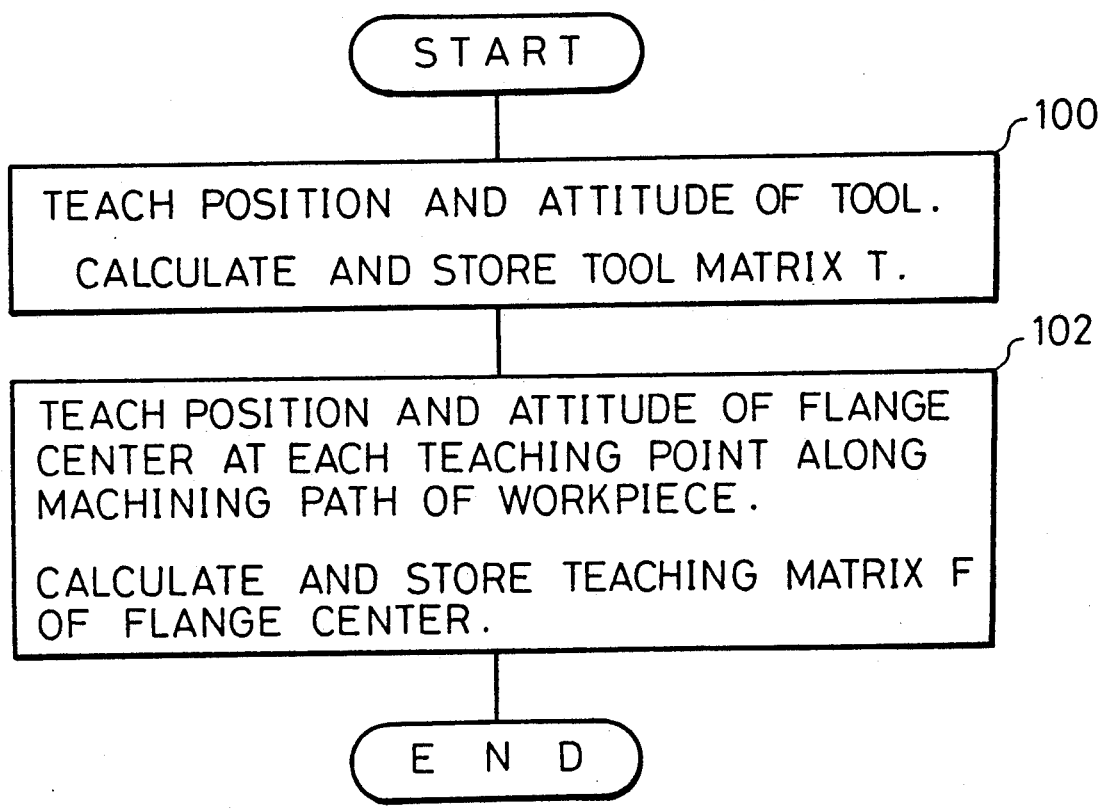
FIG. 4 is a flowchart showing what the CPU (central processing unit) of the controller in FIG. 3 does in teaching steps it follows.
Figure 5:
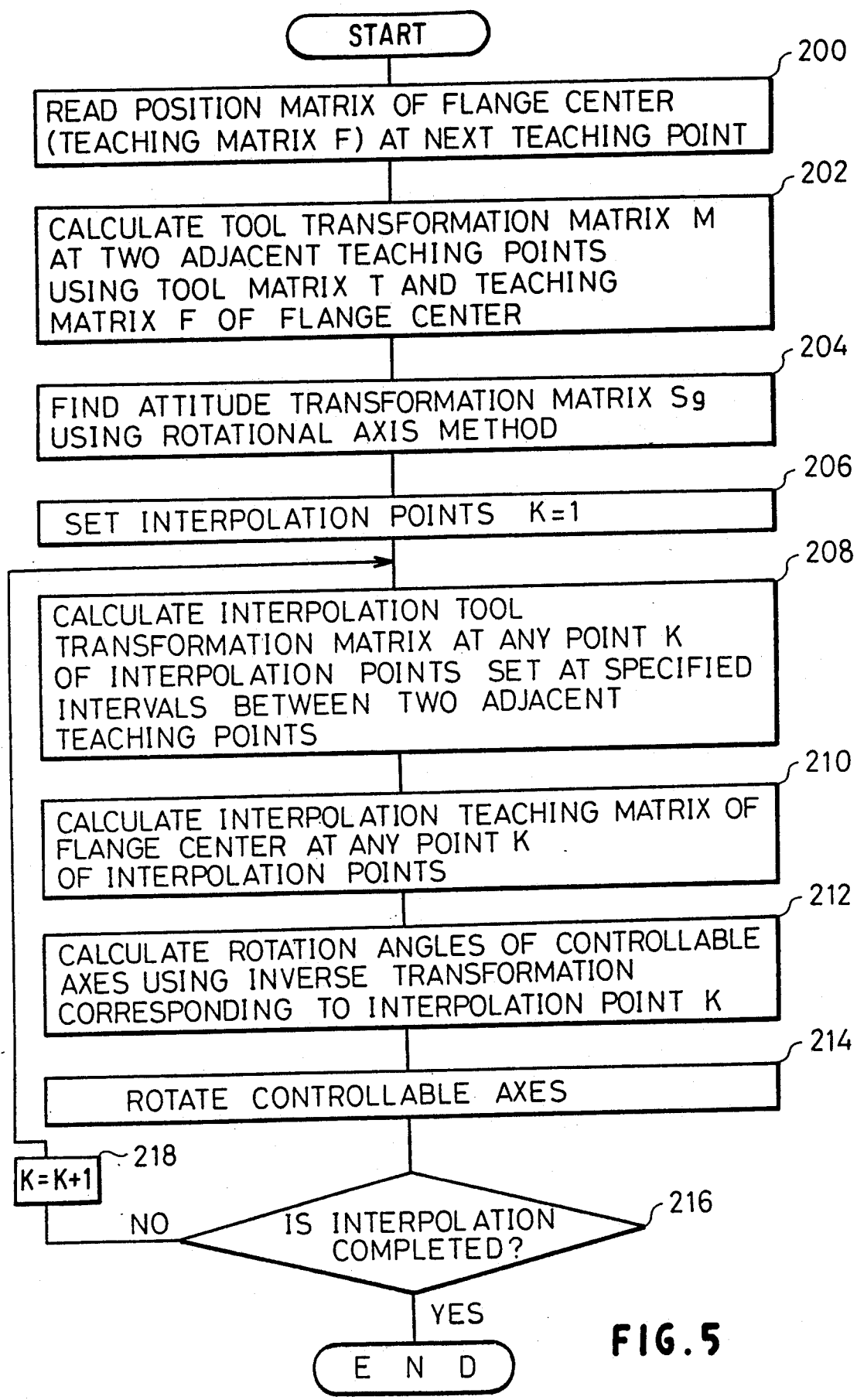
FIG. 5 is a flowchart giving steps in which the CPU of FIG. 3 carries out interpolation calculations during the machining process.

In FIG. 4, there are shown steps in which the CPU 20 gets teaching data to tell the robot what to do. In step 100, the position and attitude of the tool T are taught. A worker mounts a teaching attachment (not shown) onto the flange center of the hand 18 on the robot 10. Manually operating the control panel 26, the worker gets the tip of the teaching attachment to coincide with the tip of the tool T fixed to the tool bed 19. The attitude of the teaching attachment is manually adjusted to coincide with that of the tool T. Then the worker presses a TEACH switch on the control panel 26. This causes the CPU 20 to read the rotation angles on the controllable axes of the robot via the servo CPU's 22a through 22f. These rotation angles are used to calculate a position matrix T of the tip of the teaching attachment. The position matrix T is stored in the PDT area of the RAM 25 as a tool matrix T representing the position and attitude of the tip of the tool T.

The worker then gets the robot 18 to hold the workpiece W in the hand 18. Operating the control panel 26 manually, the worker moves the workpiece W along a predetermined machining path relative to the fixed tool T. At a plurality of points along the machining path on the workpiece W, the worker stops the robot 10 and presses the TEACH switch on the control panel 26. This causes the CPU 20, in step 102, to read the rotation angles on the controllable axes at each current point via the servo CPU'S 22a through 22f. The rotation angles are used to calculate a position matrix F for the flange center 11. That position matrix F is stored in the PDA area of the RAM 26 as a teaching matrix F representing the position and attitude of the flange center. This completes the teaching process.

Figure 6:
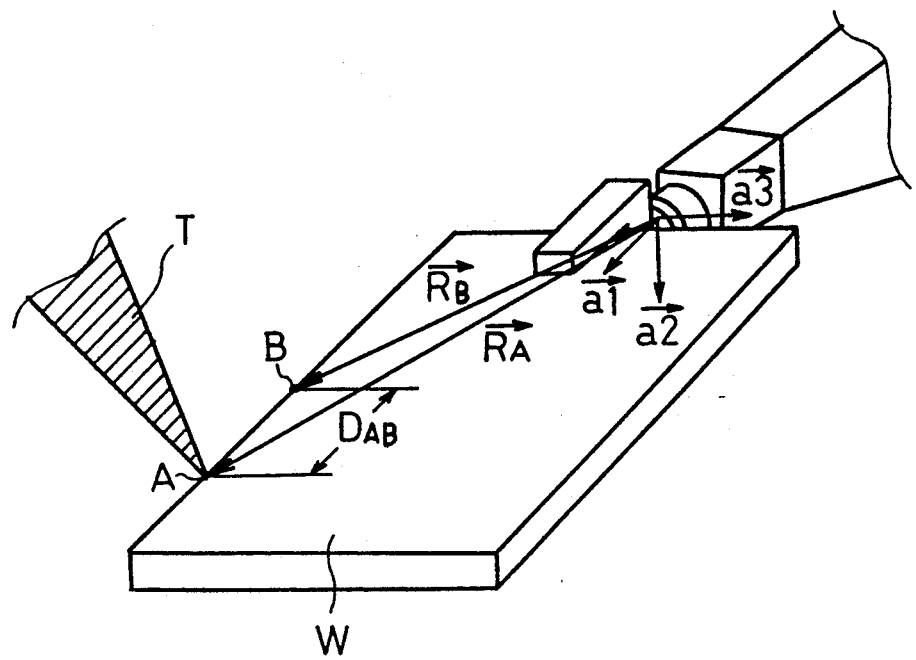
FIG. 6 is a perspective view illustrating the positions and attitudes of the tool, workpiece and robot hand at a teaching point A.

In the machining process, the CPU 20 follows the steps in the flowchart of FIG. 6. At specified interpolation intervals, the position and attitude of the flange center between teaching points are calculated through interpolation.

In step 200, there is read from the PDA area of the RAM 26 a position matrix for the flange center at two adjacent teaching points that are subject to interpolation calculations (i.e., teaching matrix F).

In step 202, there is read from the POT area of the RAM 25 a position matrix for the tip of the tool T (i.e., tool matrix T). A transformation matrix M is calculated to convert the teaching matrix F for the flange center into the tool matrix T.

Figure 7:
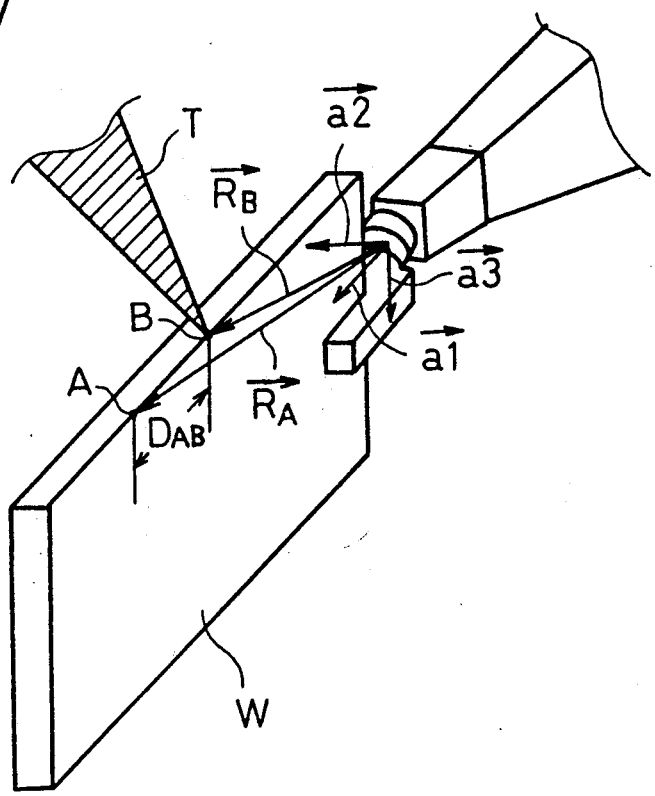
FIG. 7 is a perspective view showing the positions and attitudes of the tool, workpiece and robot hand at a teaching point B.
Figure 8:
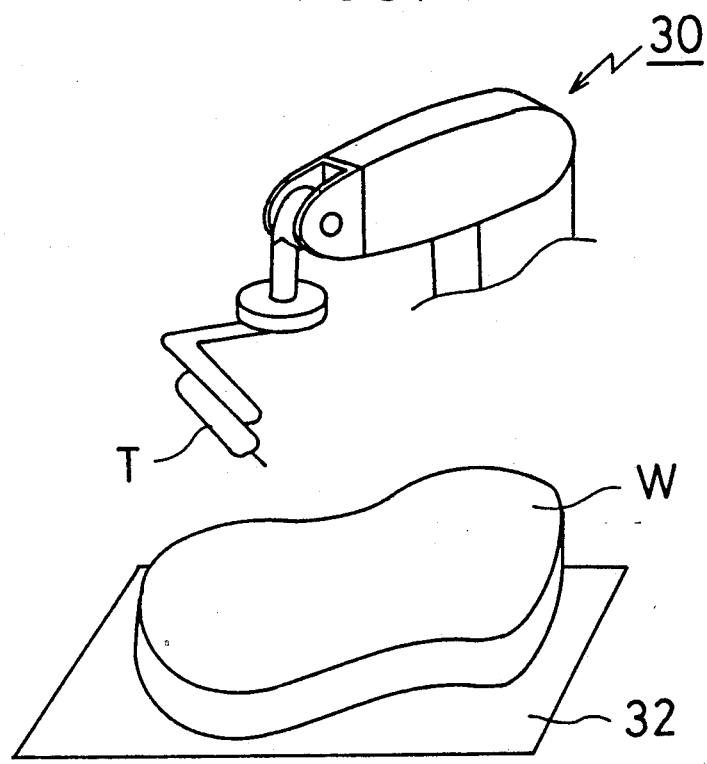
FIG. 8 is a view depicting the conventional machining method under which a robot holding a tool machines a stationary workpiece.
Figure 9:
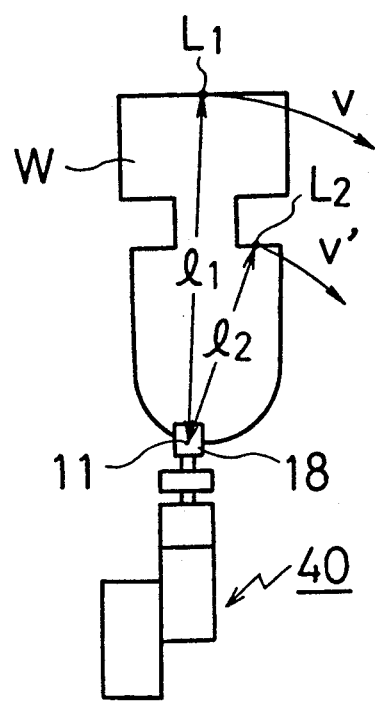
FIG. 9 is a view showing how the machining velocity at a point of machining changes in the conventional machining setup of having a workpiece held by a robot and controlling the flange center at a constant velocity.

Two adjacent teaching points, a starting point A and an end point B, are assumed to exist as shown in FIGS. 6 and 7. It is also assumed that the workpiece W is taught so as to take the attitudes as illustrated in FIG. 6 at the starting point A and in FIG. 7 at the end point B.

The tool matrix T is represented by the foregoing expression (9). Based on the expression (10) above, the expression below represents a teaching matrix $F_A$ for the flange center at the teaching point A.

$$F_A = \begin{bmatrix} F_{A11} & F_{A21} & F_{A31} & Q_{AX} \\ F_{A12} & F_{A22} & F_{A32} & Q_{AY} \\ F_{A13} & F_{A23} & F_{A33} & Q_{AZ} \\ 0 & 0 & 0 & 1 \end{bmatrix} \quad (14)$$

Using the expression (11) above, a transformation matrix $M_A$ at the teaching point A is expressed as $$M_A = \begin{bmatrix} M_{A11} & M_{A21} & M_{A31} & R_{AX} \\ M_{A12} & M_{A22} & M_{A32} & M_{AY} \\ M_{A13} & M_{A23} & M_{A33} & R_{AZ} \\ 0 & 0 & 0 & 1 \end{bmatrix}$$

$$= \begin{bmatrix} \left( \overline{M_a} \right) & \begin{matrix} R_{A1} \\ R_{A2} \\ R_{A3} \end{matrix} \\ 0 \quad 0 \quad 0 & 1 \end{bmatrix}$$

The expression below holds here based on the expression (12) above.

$$T = F_A \cdot M_A \quad (16)$$

Therefore, the transformation matrix $M_A$ at the teaching point A is calculated using the following expression:

$$M_A = F_A^{-1} \cdot T \quad (17)$$

The transformation matrix $M_A$ signifies a position matrix representing the position and attitude of the tool tip as the tool T is viewed in the Q-a1a2a3 coordinate system fixed to the flange center of the hand 18 positioned at the teaching point A.

Likewise, a transformation matrix $M_B$ for the teaching point B is calculated using the following expression:

$$M_B = F_B^{-1} \cdot T \quad (18)$$

The transformation matrix $M_B$ signifies a position matrix representing the position and attitude of the tool tip as the tool T is viewed in a Q'-a1'a2'a3' coordinate system fixed to the flange center of the hand 18 positioned at the teaching point B.

These transformation matrices $M_A$ and $M_B$ serve as transformation operators to transform the teaching matrices $F_A$ and $F_B$ into the tool matrix T. For this reason, $M_A$ and $M_B$ are called a tool transformation matrix each in this specification. The matrices $M_A$ and $M_B$ stand for relative values with respect to tool data. In that sense, the matrices are concrete examples of what is known as relative tool data. In addition, the tool transformation matrices $M_A$ and $M_B$ contain information about the attitudes of the workpiece W and the locations of the machining point at teaching points A and B. ($R_{A1}$, $R_{A2}$, $R_{A3}$) and ($R_{B1}$, $R_{B2}$, $R_{B3}$) are the coordinates of the teaching points A and B on the workpiece W. According to the present invention, the velocity at the machining point is made controllable by finding tool transformation matrices between teaching points by use of interpolation calculations.

In step 204, the expression below is used to operate a transformation matrix $S_g$ that converts the attitude matrix $\overline{M}_A$ for the tool transformation matrix $M_A$ into an attitude matrix $\overline{M}_B$ for the tool transformation matrix $M_B$ based on the rotational axis method. The transformation matrix $S_g$ is called an attitude transformation matrix. The matrix is $$S_g = \begin{bmatrix} f_{11}(g) & f_{21}(g) & f_{31}(g) \\ f_{12}(g) & f_{22}(g) & f_{32}(g) \\ f_{13}(g) & f_{23}(g) & f_{33}(g) \end{bmatrix} \quad (19)$$

Each g represents a rotation angle around the rotational axis in effect when the attitude changes from $\overline{M}_A$ to $\overline{B}_B$. As is well known, $f_{11}(g)$ through $f_{33}(g)$ are represented using the components of the unit vectors for the rotational axis along with sin(g) and cos(g).

A distance $D_{AB}$ between two adjacent teaching points A and B is expressed as
$$D_{AB} = [(R_{B1} - R_{A1})^2 + (R_{B2} - R_{A2})^2 + (R_{B3} - R_{A3})^2]^{\frac{1}{2}} \quad (20)$$

The CPU 20 then goes to step 206. In this step, interpolation points are set between the teaching points A and B according to a specified machining velocity, as described below. And an interpolation point number K is set to 1 of an initial value.

If V represents the machining velocity specified for the workpiece W, the time t required to machine the distance $D_{AB}$ is given as $$t = D_{AB}/V \qquad (21)$$

If $\Delta t$ denotes the specified interpolation interval, the number of interpolation points n is given as $$n = t/\Delta t \qquad (22)$$

In step 208, an attitude transformation matrix $S_{hK}$ is calculated. This matrix is used to convert the attitude matrix $\overline{M}_A$ of the tool transformation matrix $M_A$ at the teaching point A into an attitude matrix $\overline{M}_{CK}$ of a tool transformation matrix $M_{CK}$ at any interpolation point K.

The tool transformation matrix at an interpolation point is hereinafter called the interpolation tool transformation matrix.

The rotation angle h between any interpolation point K and the teaching point A is given as $$h = K \cdot g/n \qquad (23)$$

Therefore, the attitude transformation matrix $S_{hK}$ at any interpolation point $C_K$ is given by the following expression based on the foregoing expression (19):

$$S_{hK} = \begin{bmatrix} f_{11}(h) & f_{21}(h) & f_{31}(h) \\ f_{12}(h) & f_{22}(h) & f_{32}(h) \\ f_{13}(h) & f_{23}(h) & f_{33}(h) \end{bmatrix} \qquad (24)$$

Here, an interpolation tool transformation matrix $M_{cK}$ in effect at the interpolation point $C_K$ is defined by the following expression:

$$M_{CK} = \begin{bmatrix} M_{CK11} & M_{CK21} & M_{CK31} & R_{CK1} \\ M_{CK12} & M_{CK22} & M_{CK32} & R_{CK2} \\ M_{CK13} & M_{CK23} & M_{CK33} & R_{CK3} \\ 0 & 0 & 0 & 1 \end{bmatrix}$$

$$= \begin{bmatrix} \left( \overline{M}_{CK} \right) & \begin{matrix} R_{CK1} \\ R_{CK2} \\ R_{CK3} \end{matrix} \\ 0 \quad 0 \quad 0 & 1 \end{bmatrix}$$

The following expression holds for an attitude matrix:

$$M_{cK} = S_{hK} \cdot \overline{M}_A \qquad (26)$$

The expression below holds for position interpolation.

$$\begin{bmatrix} R_{CK1} \\ R_{CK2} \\ R_{CK3} \end{bmatrix} = \begin{bmatrix} R_{A1} + K \cdot (R_{B1} - R_{A1})/n \\ R_{A2} + K \cdot (R_{B2} - R_{A2})/n \\ R_{A3} + K \cdot (R_{B3} - R_{A3})/n \end{bmatrix} \qquad (27)$$

Thus the interpolation tool transformation matrix $M_{CK}$ in effect at the interpolation point $C_K$ is obtained from the expressions (26) and (27).

In step 210, the foregoing expression (12) is converted to $$F_{CK} = T \cdot M_{CK}^{-1} \qquad (28)$$

Using the expression (28), a position matrix $F_{CK}$ for the flange center at the interpolation point $C_K$ is calculated. The position matrix $F_{CK}$ is called an interpolation teaching matrix.

In step 212, the interpolation teaching matrix $F_{Cl}$ is used to calculate the rotation angles, shown by the expression (13), on the controllable axes of the robot 10.

In step 214, each of the controllable axes is controlled to follow its corresponding rotation angle at an interpolation control timing.

In step 216, it is judged whether or not the interpolation calculations have been completed up to the teaching point B, i.e., the end point. If the interpolation calculations are found incomplete, the interpolation point number K is added by 1 for the next point at step 218 and then step 208 is reached again to perform the calculations and control the robot attitude at the next interpolation point. When the interpolation calculations have been completed up to the teaching point B, this program is terminated for the moment. In keeping with the interpolation calculation timing for the next teaching section, the whole processing by the CPU 20 is resumed beginning in step 200.

In the manner described above, interpolation points are distributed and set according to a specified machining velocity. This arrangement allows the robot to machine the workpiece at the designated velocity with precision. In the preferred embodiment of the invention described above, tool data is represented by a tool matrix, teaching data by a teaching matrix, relative tool data by a tool transformation matrix, and interpolation teaching data by an interpolation teaching matrix. However, there may be other arrangements whereby various data are represented in various formats. It is also to be understood that while the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. A robot controller for having a workpiece held by a robot in a hand thereof and for having said workpiece machined by moving it through control over the position and attitude of said hand against a tool fixedly mounted on a tool bed, comprising:

a first memory means for storing as tool data those data representing the position of the tip of said tool fixedly mounted on said tool bed as well as the attitude of said tool;

a second memory means for storing as teaching data at a plurality of teaching points, those data representing the position of the origin of a coordinate system fixed to said hand of said robot as well as the attitude of said hand with respect to each of said plurality of teachings points along a machining path determined on said workpiece;

a calculating means for calculating as relative tool data at each teaching point those data representing the attitude of said tool and the position of the tip thereof located in said coordinate system fixed to said hand of said robot, said calculating being accomplished through the use of tool data stored in said first memory means and of said teaching data at each teaching point stored in said second memory means;

a first interpolation means for setting interpolation points along the machining path between any adjacent two of said teaching points according to a specified machining velocity, in order to calculate as interpolation relative tool data the position of said tool in said coordinate system fixed to said hand as well as the attitude of said tool at each of said interpolation points by the use of said relative tool data in effect at said two adjacent teaching points;

a second interpolation means for calculating as interpolation teaching data those data representing the attitude of said hand and the position of the origin of said coordinate system fixed to said hand of said robot at each of said interpolation points, said calculation being accomplished through the use of said interpolation relative tool data at each interpolation point calculated by said first interpolation means and of said tool data stored in said first memory means; and a control means for calculating rotation angles on movable axes of said robot based on said interpolation teaching data in effect at each interpolation point and calculated by said second interpolation means, in order to control the position and attitude of said hand of said robot by having said movable axes follow said rotation angles.

2. A robot controller for having a workpiece held by a robot in a hand thereof and for having said workpiece machined by moving it through control over the position and attitude of said hand against a tool fixedly mounted on a tool bed, comprising:

a first memory means for storing the position of the tip of said tool fixedly mounted on said tool bed as well as the attitude of said tool, said position and said attitude being stored in the form of a four-row, four-column tool matrix represented by homogeneous coordinates of a stationary coordinate system fixed in space;

a second memory means for storing the position of the origin of a coordinate system fixed to said hand of said robot as well as the attitude of said hand with respect to a plurality of teaching points along a machining path determined on said workpiece, said position and said attitude being stored in the form of a four-row, four-column teaching matrix at each of said plurality of teaching points represented by homogeneous coordinates of said stationary coordinate system fixed in space;

a means for calculating as a tool transformation matrix at each of said plurality of teaching points a transformation matrix represented by homogeneous coordinates for transforming said teaching matrix into a tool matrix, with a calculation being performed by said means for calculating through the use of said tool matrix stored in said first memory means and of said teaching matrix at each teaching point stored in said second memory means;

a first interpolation means for setting interpolation points along the machining path between any adjacent two of said teaching points according to a specified machining velocity, in order to calculate as an interpolation tool transformation matrix a tool transformation matrix at each of said interpolation points by the use of said tool transformation matrix in effect at said two adjacent teaching points;

a second interpolation means for calculating a four-row, four-column interpolation teaching matrix which is represented by homogenous coordinates of said stationary coordinate system fixed in space and which indicates the attitude of said hand and the position of the origin of said coordinate system fixed to said hand of said robot at each of said interpolation points, through the use of said interpolation tool transformation matrix at each interpolation point calculated by said first interpolation means and of said tool matrix stored in said first memory means; and a control means for calculating rotation angles on movable axes of said robot based on said interpolation teaching matrix in effect at each interpolation point and calculated by said second interpolation means, in order to control the origin position and attitude of hand of said robot by having said movable axes follow said rotation angles.

3. A robot controller according to claim 1, wherein said first interpolation means obtains a rotation angle around a predetermined axis and a distance of movement from said relative tool data at any of said plurality of teaching points which are adjacent, said rotation angle and said distance of movement being split into equal divisions according to a specified machining velocity, the position and attitude of said tool at each of distributed interpolation points in said coordinate system fixed to said hand being calculated as interpolation relative tool data.

4. A robot controller according to claim 2, wherein said first interpolation means obtains a rotation angle around a predetermined axis and a distance of movement from said tool transformation matrix at any adjacent two of teaching points, said rotation angle and said distance of movement being split into equal divisions according to a specified machining velocity so as to determine interpolation points between said two adjacent teaching points, a matrix which is an operator for rotating around said predetermined axis by divided rotation angles being calculated as an attitude transformation matrix, said attitude transformation matrix being applied to an attitude matrix of said tool transformation matrix at the first to be machined of said two adjacent teaching points in order to calculate an attitude matrix of said tool transformation matrix at each interpolation point, components of a position vector for an interpolation tool transformation matrix being calculated from adding components of a displacement vector from a first teaching point to each interpolation point to components of a position vector of a first teaching point in said coordinate system fixed to said hand of said robot.

* * * * *